United States Patent Office 3,574,590
Patented Apr. 13, 1971

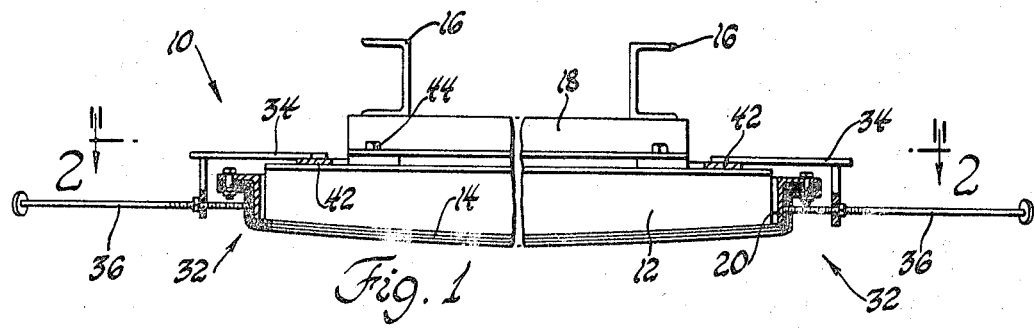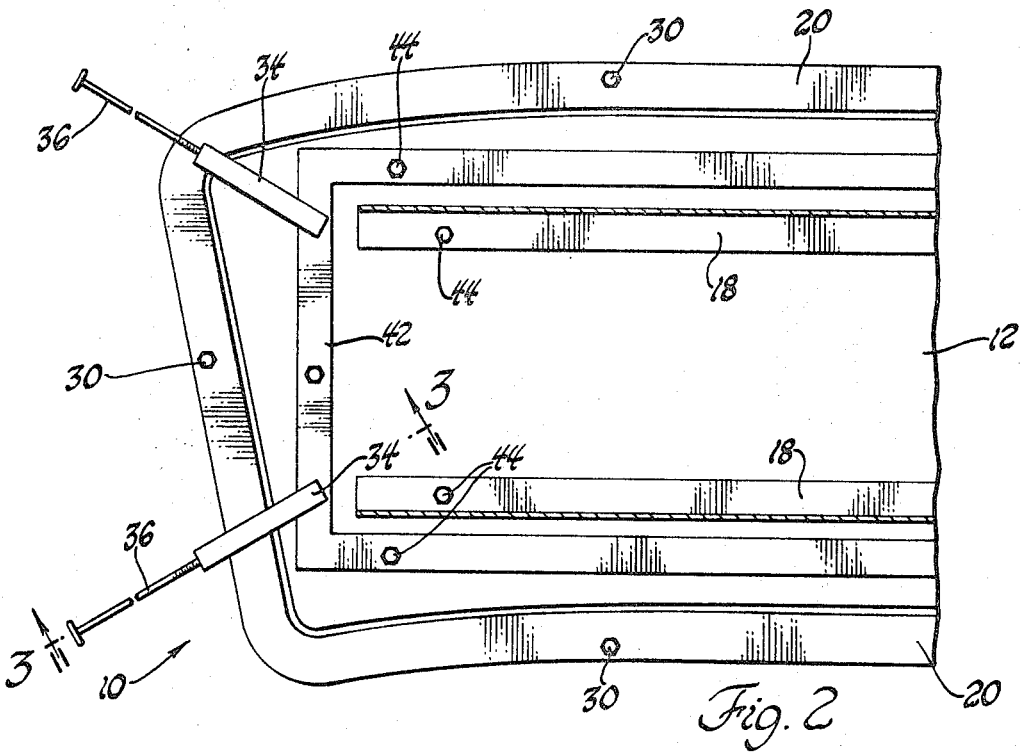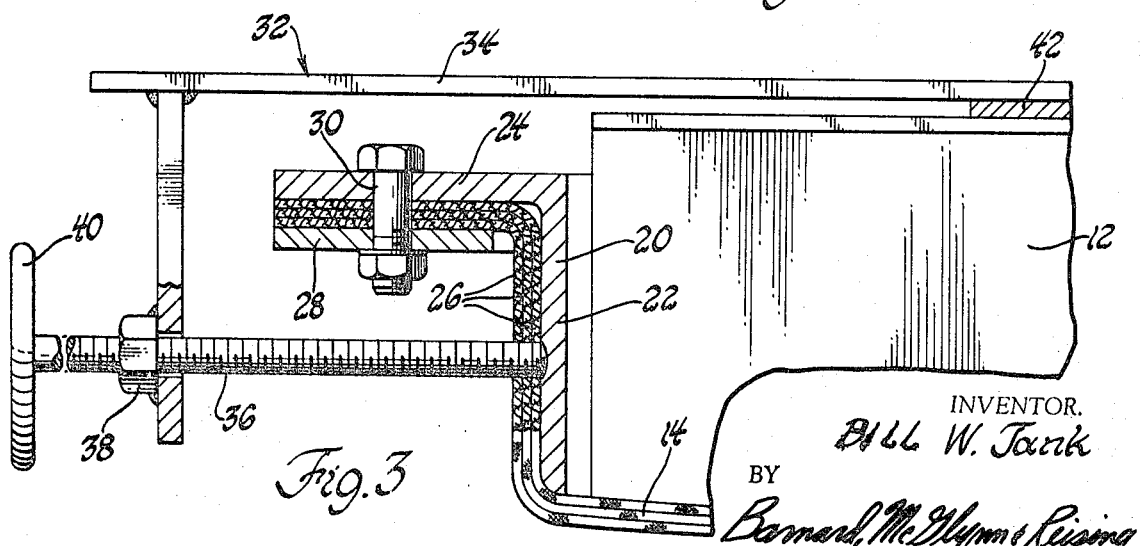

3,574,590
GLASS BENDING MOLD ASSEMBLY
Bill W. Tank, Martin, Ohio, assignor to Permaglass, Inc.
Filed Apr. 10, 1968, Ser. No. 720,028
Int. Cl. C03b 23/02
U.S. Cl. 65—287                                                     3 Claims

ABSTRACT OF THE DISCLOSURE

A glass treating assembly of the type including means for heating a sheet of glass, a press mold having a glass pressing surface for curving the sheet. The improvement comprises a frame with insulating material attached to the frame and an attachment means removably supporting the frame adjacent the mold so that the insulating material covers the pressing surface of the mold with the attachment means being operable for allowing the frame to be removed from the mold, whereby the insulating material may be replaced when the frame is at a position remote from the heat of the assembly. Another feature is the utilization of a plurality of layers of fiberglass cloth as the insulating material.

---

Various assemblies are known in the prior art wherein a sheet of glass is pressed against a surface for bending or curving the sheet. Although it will be understood by those skilled in the art that the instant invention may be utilized with many of the prior art devices, it is particularly suited for use with the glass treating assembly of the type disclosed in co-pending application Ser. No. 691,326 filed Dec. 18, 1967 in the name of Harold A. McMaster and assigned to the assignee of the instant invention. As disclosed therein, there is included a gas support bed over which a sheet of glass is supported on fluid while heated to a deformation temperature. Thereafter, a frame lifts the sheet of glass and conveys the sheet to a position where it is pressed into engagement with a mold surface. Immediately upon reaching the desired shape, the frame very rapidly moves the sheet of glass from the mold surface and into a cooling medium for tempering so that the glass is tempered without changing shape. The mold in the preferred embodiment is preferably made of metal and has a machined pressing surface against which the sheet of glass is pressed. If the sheet of glass were to be pressed against the aluminum mold surface, the difference in temperature between the glass and the aluminum mold would cause the glass to rapidly cool on one face thereof to establish unsatisfactory stresses in the glass. Thus, it has been the practice to attach a layer of insulating material to the mold so that the insulating material covers the pressing surface on the mold. Experience with such assemblies is that fifty (50) to sixty (60) sheets of glass can be pressed against the insulating material before the insulating material wears to the extent that it must be replaced. It is very difficult to replace the insulating material because it is secured to the mold sides and the temperatures adjacent the mold are too high for personnel to detach the insulating material from the mold. Therefore, the assembly must be shut down to reduce the temperature in order to replace the layer of insulating material. Thus, a long downtime is necessary to replace the insulating material secured to the mold.

Accordingly, it is an object and feature of this invention to provide a glass treating assembly including a mold having a pressing surface against which a sheet of glass is pressed wherein the downtime required for replacing the insulating material is greatly reduced and the wear capabilities of the insulating material are greatly increased so that longer runs are had without the requirement of changing the insulating material.

Another object and feature of this invention is to provide a mold against which a sheet of glass is pressed in combination with a frame which supports insulating material across the mold and is readily removable from the mold so that it may be taken to a remote position to replace the insulating material without the necessity of shutting down the assembly because of the high heat about the mold.

A further object and feature of this invention is the utilization of a plurality of layers of insulating material over the pressing surface of a mold to greatly increase the length of time such insulating material will last without the necessity of replacement.

Other objects and attendant advantages of the present invention will be readily appreciated as the same becomes better understood by reference to the following detailed description when considered in connection with the accompanying drawings wherein:

FIG. 1 is a cross sectional view taken substantially along the longitudinal axis of a mold;

FIG. 2 is a fragmentary plan view taken substantially along the line 2—2 of FIG. 1; and FIG. 3 is an enlarged fragmentary cross sectional view taken substantially along line 3—3 of FIG. 2.

Referring now to the drawings, wherein like numerals indicate like or corresponding parts throughout the several views, a preferred embodiment of the instant invention is generally shown at 10. As alluded to above, the instant invention is used in a glass treating assembly of the type including means for heating a sheet of glass, a press mold 12 having a glass pressing surface 14, and means for pressing the sheet of glass against the glass pressing surface 14 for curving the sheet. The mold 12 is supported by the beams 16 through channel members 18. This total structure is more specifically disclosed in the aforementioned patent application.

There is included a metal frame 20 including first and second flanges 22 and 24 as best illustrated in FIG. 3. The first and second flanges 22 and 24 are disposed at a right angle with respect to one another. Insulating material 26 is attached to the frame. More specifically, a ring or plate-like retainer 28 is removably attached to the second flange 24 by bolts 30 for clamping the insulating material 26 against the second flange 24. The insulating material 26 covers the pressure surface 14 of the mold 12.

There is also included attachment means generally indicated at 32 removably supporting the frame 20 in a position adjacent the mold so that the insulating material 26 covers the pressing surface 14. The attachment means is operable for allowing the frame 20 to be removed from the mold 12 whereby the insulating material 26 may be replaced when the frame 20 is at a position remote from the mold 12 and, hence, remote from the heat of the assembly about the mold 12.

The attachment means 32 includes a plurality of support members which are generally L-shaped. A threaded rod 36 threadedly coacts with a nut 38 of the support member 34 and has an end thereof engaging the flange 22 of frame 20 for supporting the frame. The mold 12 is elongated and has first and second ends and the rods 36 are disposed to extend away from the mold 12 generally at the first and second ends thereof. Each threaded rod 36 has a T handle 40 at the end thereof, and the rods extend a relatively large distance away from the mold. Sheets of glass are normally moved through a furnace and laterally into the side of the mold and thereafter moved out the other side to a cooling medium; thus, the coolest area about the mold is adjacent each end thereof and, therefore, the rods 36 extend from the ends of the mold. The rods 36 extend a large distance from the mold so that the handles 40 are as far as possible from the heat around the mold.

There is also included an auxiliary frame member 42 which is removably attached to the top of the mold 12 by bolts 44. The support members 34 are attached to the auxiliary frame 42 as by welding or the like. This allows the auxiliary frame to be removed from the mold 12 and utilized with a different mold having a different configuration.

An important feature of this invention is the discovery that by utilizing a plurality of layers of insulating material, the wear of the insulating material is greatly increased to increase the number of sheets of glass which may be pressed there against before requiring the insulating material to be replaced. In the preferred embodiment, the mold 12 is made of aluminum and the insulating material comprises a plurality of layers of fiberglass cloth. As mentioned herein before, it was common practice to obtain only fifty (50) to sixty (60) pieces of glass when pressing against insulating material of a single layer. By using a plurality of layers, however, runs of four hundred (400) to five hundred (500) pieces of glass have been made without requiring a change in the insulating material. Furthermore, in accordance with the instant invention, even when the insulating material must be changed, the downtime is greatly reduced by utilizing the removable frame 20.

A distinct advantage in utilizing this method for treating a sheet of glass is that a higher number of sheets of glass are curved without shutting down or otherwise changing the furnace so that there are a larger number of sheets of glass which are substantially identical in tolerances.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. In a glass treating assembly of the type including means for heating a sheet of glass, a press mold having a glass pressing surface, and means for pressing the sheet against the pressing surface for forming the sheet, the improvement comprising: a frame disposed about the mold, at least one sheet of insulating material for covering said pressing surface, means removably attaching said insulating material to said frame for tensioning said insulating material in at least two transverse directions, attachment means removably connecting said frame to the mold for allowing said frame to be removed from said mold with said insulating material attached to said frame so that said insulating material may be replaced when said frame is at a position remote from the heat of said assembly.

2. In an assembly as set forth in claim 1 wherein said insulating material includes a plurality of layers of fiberglass cloth.

3. In an assembly as set forth in claim 1 wherein said attachment means includes a support member extending from said mold and means supported thereby for releasably engaging said frame.

References Cited
UNITED STATES PATENTS

| | | | |
|---|---|---|---|
| 3,329,494 | 7/1967 | Carson et al. | 65—374X |
| 3,469,963 | 9/1969 | Beattie | 65—374X |

ARTHUR D. KELLOGG, Primary Examiner

U.S. Cl. X.R.

65—275, 374